Aug. 7, 1962　　　　E. E. VAN HAM　　　　3,048,036
LIQUID LEVEL BOILER GAGE WITH IDENTICAL
LEVEL RESPONSE AT ALL TEMPERATURES
Filed July 24, 1956　　　　　　　　　　9 Sheets-Sheet 1
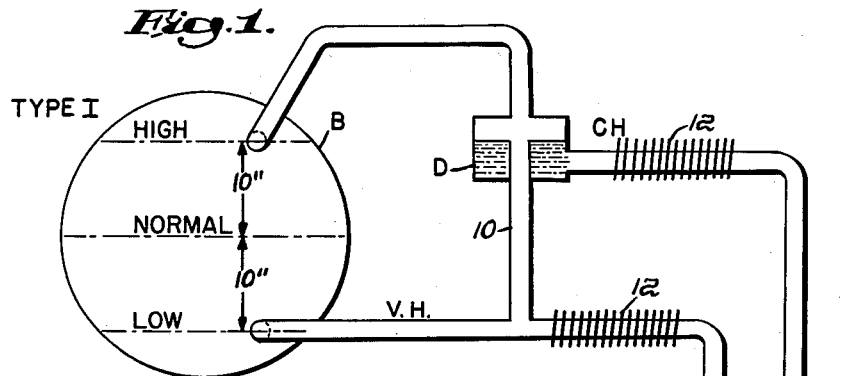
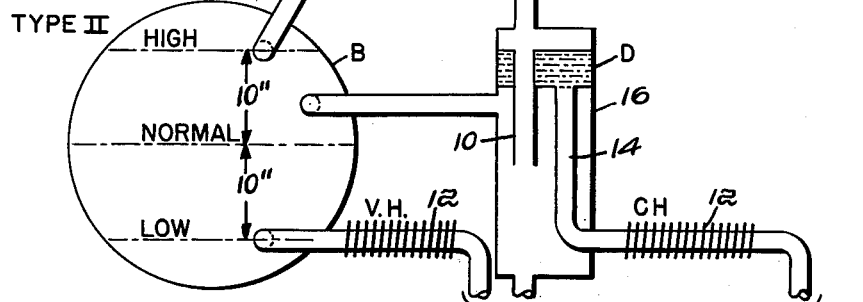
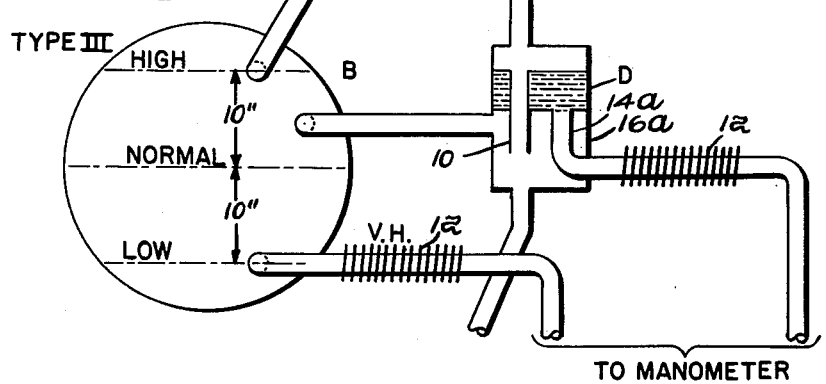
Inventor:
Ernest E. van Ham,
by Emery, Booth, Townsend
Miller & Werdner Attys Inventor:
Ernest E. van Ham,
by Emery, Booth, Townsend, Miller
 Weidner
Attys Aug. 7, 1962  E. E. VAN HAM  3,048,036
LIQUID LEVEL BOILER GAGE WITH IDENTICAL
LEVEL RESPONSE AT ALL TEMPERATURES
Filed July 24, 1956  9 Sheets-Sheet 5

Inventor:
Ernest E. van Ham,
By Emery, Booth, Townsend,
Miller & Weidner  Attys

Aug. 7, 1962
E. E. VAN HAM
3,048,036
LIQUID LEVEL BOILER GAGE WITH IDENTICAL
LEVEL RESPONSE AT ALL TEMPERATURES
Filed July 24, 1956
9 Sheets-Sheet 6
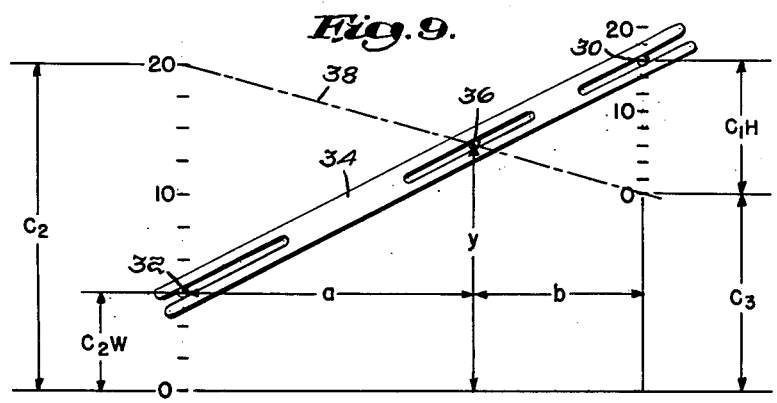
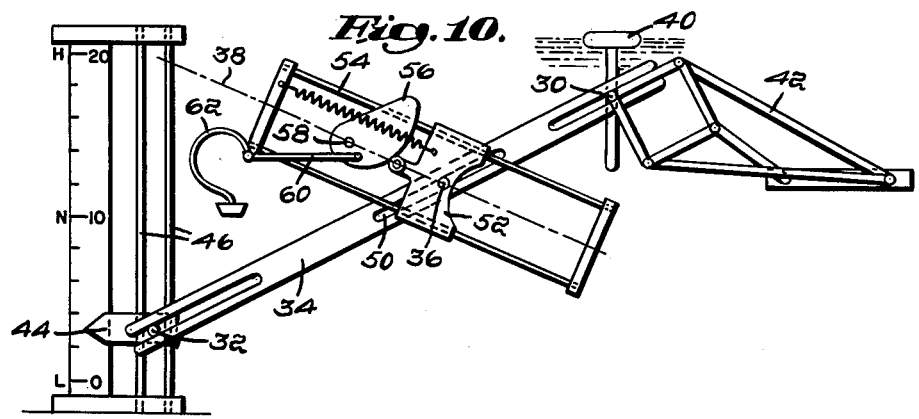
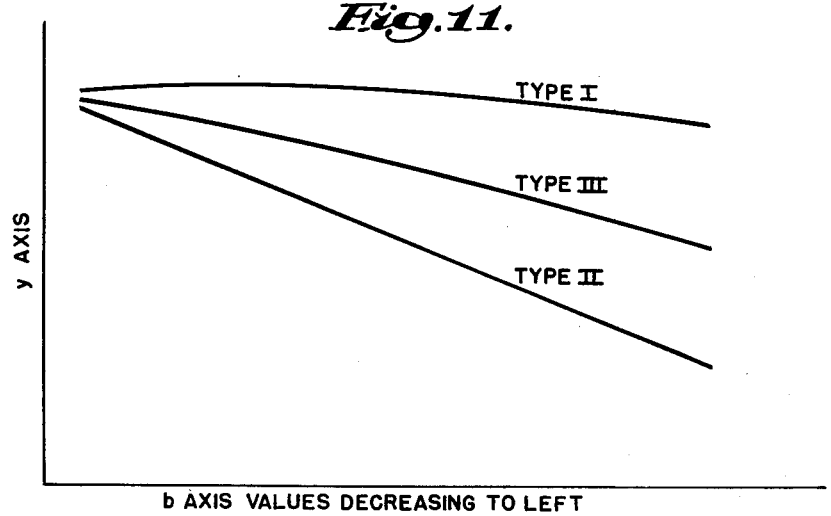
Inventor:
Ernest E. van Ham,
by Emery, Booth, Townsend, Miller, Weidner Attys

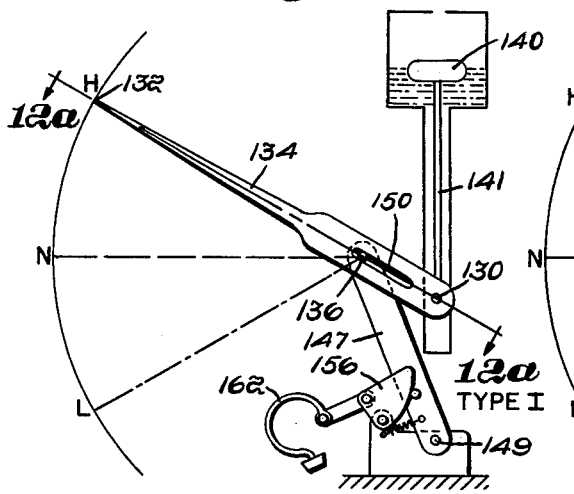
Fig. 12.
TYPE I
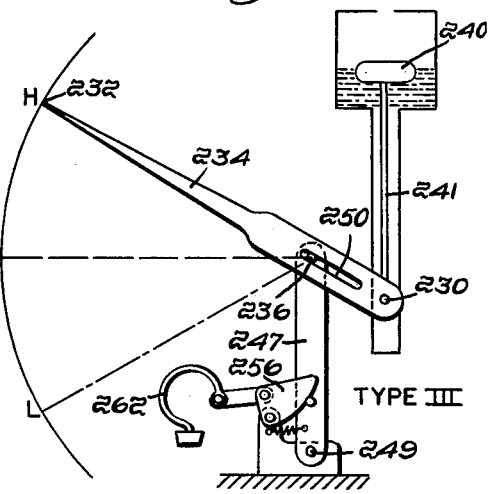
Fig. 13.
TYPE III
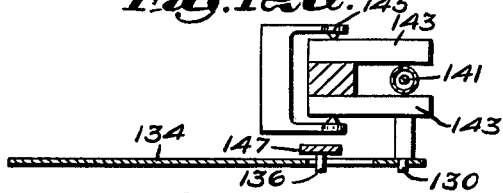
Fig. 12a.
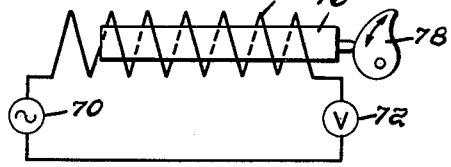
Fig. 14.
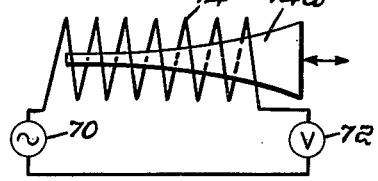
Fig. 15.
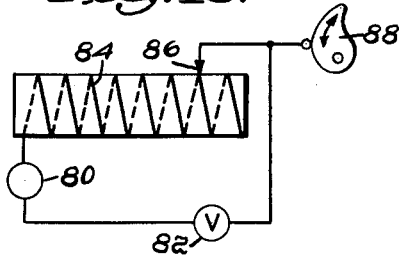
Fig. 16.
Fig. 17.
Inventor:
Ernest E. vanHam,
by Emery, Booth, Townsend, Miller
 Weidner
Attys

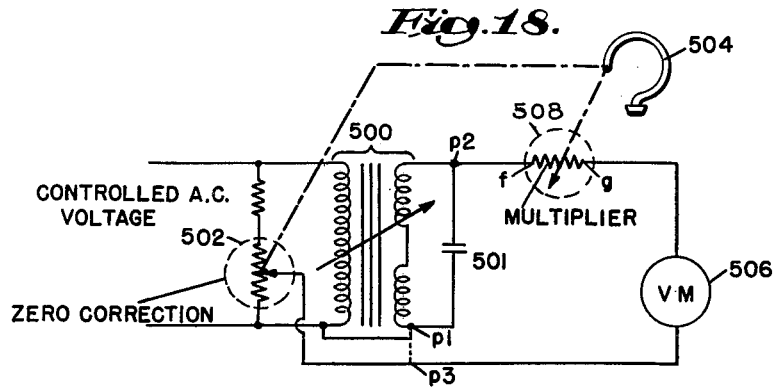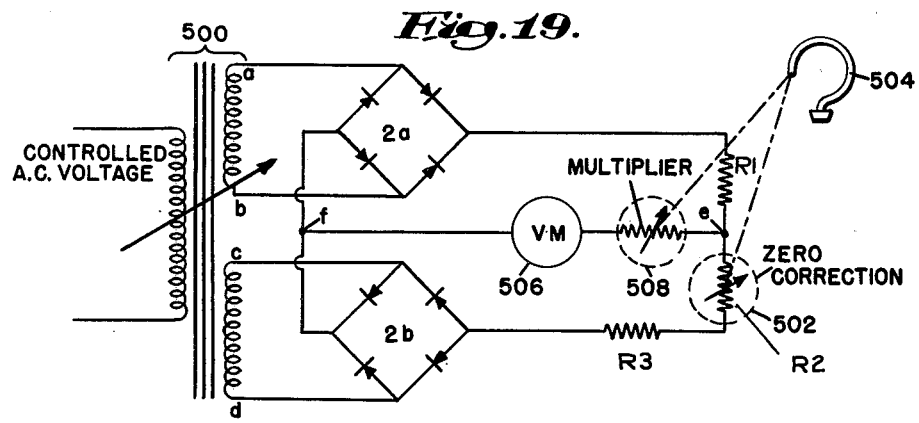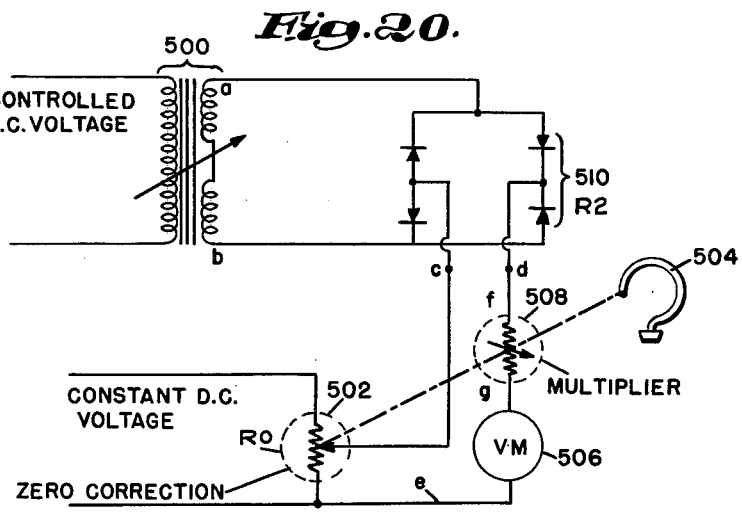

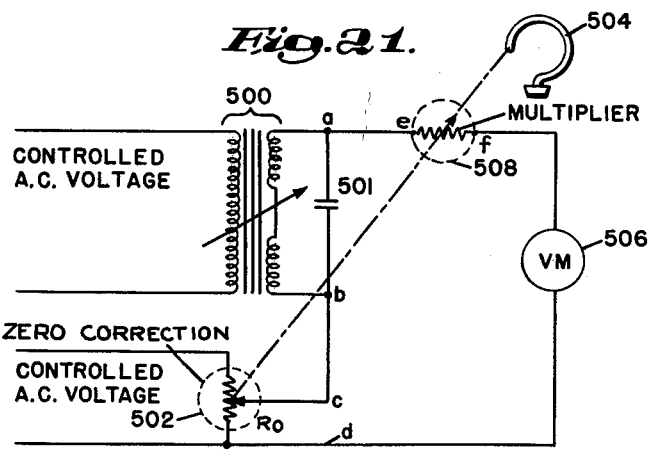
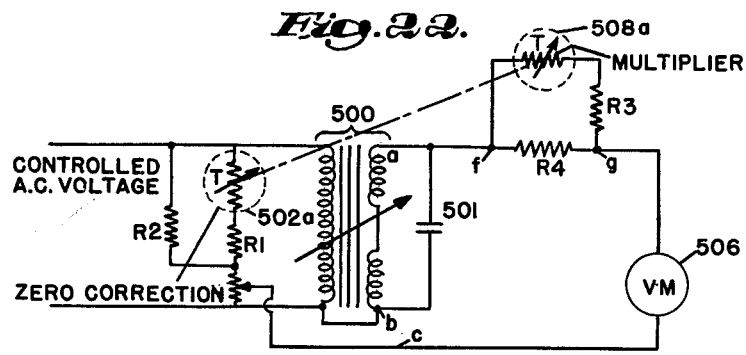
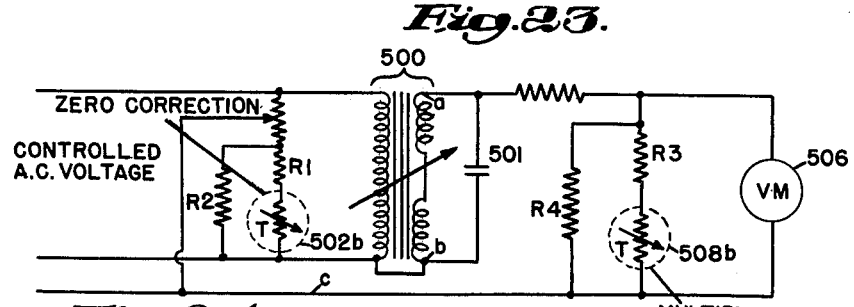
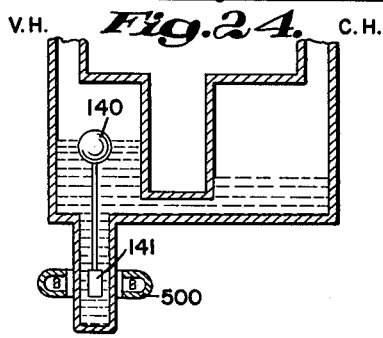

United States Patent Office 3,048,036
Patented Aug. 7, 1962

3,048,036
LIQUID LEVEL BOILER GAGE WITH IDENTICAL LEVEL RESPONSE AT ALL TEMPERATURES
Ernest E. van Ham, Somerville, Mass., assignor to Jerguson Gage & Valve Co., Somerville, Mass., a corporation of Massachusetts
Filed July 24, 1956, Ser. No. 599,839
12 Claims. (Cl. 73—290)

This invention relates to liquid-level measuring means for use with high pressure steam boilers and the object is to provide suitable installation which, as the liquid-level in the boiler varies, will cause movement of a governed part to positions definitely related to that level, to be visually observed or recorded or to govern an auxiliary mechanism such as feed water pump, or all these functions, and one wherein the positions of the governed part (hereinafter referred to as an indicator or as giving an indication) will be identical for the same actual height of water in the boiler, whatever the temperature and pressure conditions within the same. For this purpose I utilize with suitable modifications a differential pressure gauge or differential manometer which measures the differential between the head of a column of liquid of constant height and that of a column of liquid of a variable height corresponding to the level of water in the boiler.

In the operation of a boiler it is desired to operate the same with the water at a certain normal operating level. The water may rise above this to a "high water level," but if it goes too high there is danger that water may be carried over into the steam turbine. If it goes too low there is danger that some portion of the boiler exposed to the fire may be uncovered and burned out. In a typcial instance in boiler practice provision is made for a fluctuation of twenty inches, ten above and ten below a normal level. The ten inches above is "high water" level and is usually a little less than the excessive high water which would cause trouble. The "low water" level of ten inches below normal is usually somewhat above the low point which would cause trouble. For convenience I shall herein refer to an instrument having a range of twenty inches, ten inches above normal to high and ten inches below normal to low, as this will correspond to a typical case and make the explanation simpler. These specific examples however are merely exemplary and other ranges could be conceived of and the calculations herein quoted would be correspondingly modified.

As far as I am aware, the patent to Tripp, No. 722,645, was the first to propose the use for liquid level measurements of a differential manometer one side of which was subject to a constant head, by which I mean the weight of a column of water of a certain height measured in linear units, and the other side to a variable head proportional to the height of the liquid in a container. In its application to a boiler the constant head was most frequently taken as the "high pressure" side of the manometer representing a column the surface of which was at least as high as the high water level, although theoretically this is not necessary. On the other hand the variable head was proportional to the height of water in the boiler and represented a column of water within the shell based on an offtake pipe extending therefrom at or below the low water mark in the sense above referred to, and at least the portion thereof above the take off point was therefore subject to the temperature and pressure conditions within the boiler. Variations and modifications of the Tripp disclosure have been utilized in boiler practice, as will appear.

It seems desirable, before continuing this discussion, to provide for reference to illustrations, and I therefore here give brief descriptions of the drawings which are annexed to this specification wherein:

FIGS. 1, 2 and 3 are diagrams of different arrangements hitherto used in connection with a boiler for applying to a differential manometer a constant head and a variable head;

FIGS. 4 through 8 are graphs sufficiently identified by the legends thereon;

FIG. 9 is a diagram illustrating the principles of a mechanical means for compensating the indications of a manometer for the variations in specific gravity of boiler water and steam at different temperatures.

FIG. 10 is a diagrammatic view of an instrument of the type shown in FIG. 2 provided with mechanical compensating means;

FIG. 11 is a graph showing loci of the movable fulcrums on FIG. 9 for the several types of instrument;

FIG. 12 is a diagrammatic view in elevation of an instrument of the type shown in FIG. 1, provided with mechanical compensating means;

FIG. 12a is a simplified section on line 12a—12a of FIG. 12;

FIG. 13 is a diagrammatic view of an instrument of the type shown in FIG. 3 provided with mechanical compensating means;

FIGS. 14 through 17 are diagrams of devices for non-linearly modifying an electromotive force;

FIGS. 18 through 23 are electrical diagrams showing electrical responsive means and compensating means for the same for use in installations of the types shown in FIGS. 1, 2 and 3; and FIG. 24 is a schematic view of one form of differential manometer and shows a differential transformer associated therewith to provide for translating the changes of differential into electrical forces.

Figure 4:
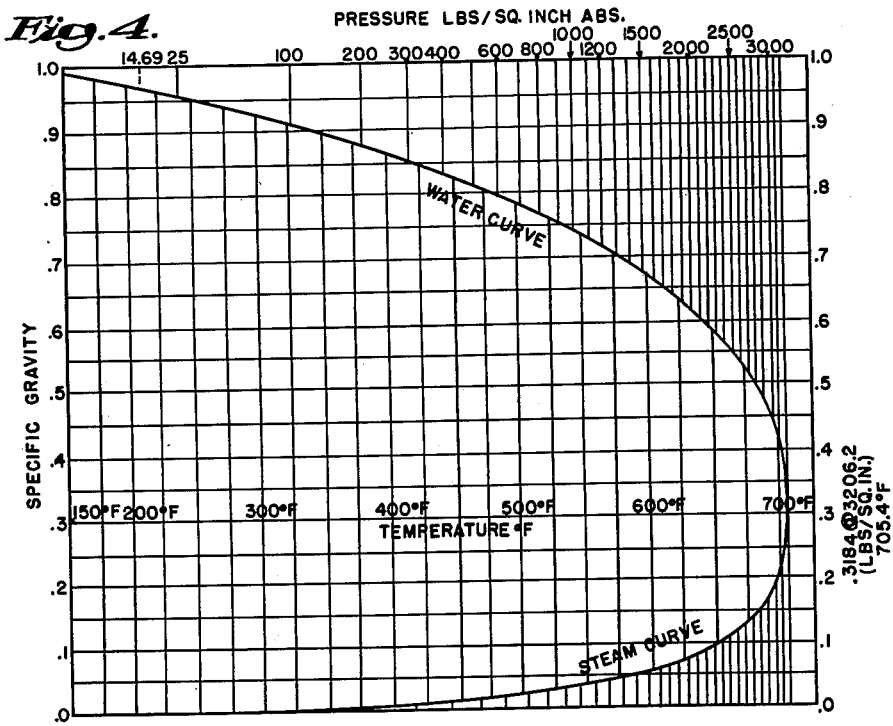

Referring now to FIG. 1, this represents diagrammatically an installation in accordance with the Tripp patent which I shall hereinafter refer to as Type I, but embodying certain auxiliary improvements as disclosed in the patent to Winton 2,337,171. The constant head is determined by the level of liquid in the datum cup D, which may be replenished by condensate from the boiler B, the level in the datum cup being maintained at a constant level by an overflow 10, while the variable head is taken as shown from a point in the boiler B at least as low as the low water mark as shown. The datum cup D is subject to ambient temperature external to the boiler and I have herein shown a horizontal offtake therefrom substantially at the overflow level provided with cooling fins 12, this being a diagrammatic illustration of the fact that the constant head water column is cooled to ambient temperature substantially throughout its height as described in the Winton patent above referred to, and similar cooling fins 12 are shown on the horizontal offtake for the variable pressure head. In practice actual cooling fins would not be necessary but some such an arrangement as described in the Winton patent would be used. The columns of cooled water in the vertical lengths of pipe or tubing below the low pressure level which lead to the manometer are at ambient temperature and balance each other, and the significant values of the constant and variable heads are the distances above that low water line. We then have a constant head of twenty inches of cold water and a variable head of a certain number of inches of water corresponding to the level within the boiler, which is subject to the temperature conditions within the boiler and whose weight per inch of head may therefore be different from the weight per inch of head on the constant head side. The manometer has such a range as to be capable of handling a differential of twenty inches of cold water.

FIG. 2 refers to an arrangement as shown in the patent to Winton 2,337,171 which I shall refer to as Type II. Herein the datum cup D and the downwardly extending extension therefrom 14 to the low water mark are maintained at the temperature conditions within the boiler as by means of the steam jacket 16 shown. The offtake at the constant head side of the manometer is offset at this point and is diagrammatically shown as provided with cooling fins 12 as before. The connection at the variable head side is similar to that in FIG. 1. A variant of Type II wherein the datum cup is within the boiler shell is seen in Winton Patent 2,347,860.

In FIG. 3 I have shown a third type of construction which may be termed Type III in which an extension 14a of the datum cup terminates in the horizontal offtake at the "normal" water level and the steam jacket 16a heats the datum cup and its extension 14a and, at the normal water level a horizontal offtake with the cooling means 12, transmits the weight of the column in the cup and its extension 14a to the high pressure side of the manometer. The connection at the variable side is the same as in the other cases. This construction and variants thereof are shown in Patent 2,747,404, May 29, 1956.

Referring now to the Type I and FIG. 1, if we were concerned with a mere unheated tank filled with cold water and maintained the level of water in the datum cup by dribbling water into it from an external source, the differential pressure indicated by the manometer would be directly proportional to the height of water in the tank in inches. There would be the head of a cold water column on the constant head side, exerting the pressure of its weight acting against the pressure of a cold water column of variable height exerting its weight on the variable head side. For boilers operating at very low temperatures and pressures, such as an ordinary house heating boiler the indications, like those of the ordinary gauge glass, would probably suffice for practical purposes. In industrial uses however the temperatures are high and it has previously been recognized that with the range of temperatures common in industrial boiler practice the actual weight of the column of water in the boiler of a certain number of inches is variable. If precautions are taken to keep all connection external to the boiler horizontal until the water therein reaches ambient (cold water) temperature, the pressures on the manometer will be limited to those attributable to heads above the low level as is desired. Referring now to FIG. 1 it will be clear that if the water sinks to the low point in the variable head side, the differential will be at the maximum of twenty inches of cold water and as the boiler fills this differential will decrease by an amount dependent not only on the actual change of level but also upon the temperature of the water. The differential (20—V.H.) will be greater as the temperature rises and the specific gravity falls. Since hitherto the significant influence of the actual weight of the steam as hereinafter explained was not appreciated the indication of the manometer therefore was taken to be always the same at "low water," but at higher levels proportionately lower than the actual level as the specific gravity of the water in the boiler decreased on increase of temperature.

In the case of Type II as shown in FIG. 2, the constant head is a column of water at the actual temperature of the boiler and so is the variable head. If the boiler fills to the "high" level the two heads are the same and the differential disappears. The indication of the manometer is the same at high water, no matter what the temperature. The indication at any level is always a comparison of two columns of water at the same temperature and, so far as the specific gravity of the water goes, it indicates the weight of a column of water in the boiler of the same height as actually exists, but the lower the specific gravity of the water the less this weight is, and the response of the instrument is not the same for different boiler temperatures.

In Type III as illustrated in FIG. 3, when the water level in the boiler is at normal the constant head on the manometer is the ten inches of hot water in the datum cup D and its extension 14a plus ten inches of cold water in the downcomer from that extension to the low water level and the variable head is so many inches of hot water above the low level. Here again and in the immediately following sentences the significant influence of the weight of steam is neglected. In FIG. 3 if the boiler is filled to the normal level the variable pressure head of ten inches balances the pressure head in the datum cup and its extension 14a above the normal water line whatever the specific gravity of the water and therefore the differential applied to the manometer is the ten inches of cold water in the downcomer of the constant head connection between normal and low. The manometer scale may be adjusted so that normal is always indicated when the water in the boiler is at normal, but decrease in density of the water as the temperature increases will cause the indicating movement to be less as the water rises toward high, and also less as it falls toward low.

It has also been proposed in connection with an arrangement of the Tripp type as shown in FIG. 1, to provide in connection with the manometer a compensating mechanism which would alter the indication proporttionately to the specific gravity of the water, which varied with its temperature which in turn varied with the pressure within the boiler and therefore could conveniently be operated by a suitable pressure gauge responsive to the boiler pressure such as a Bourdon tube.

Variations in the specific gravity of the water are significant at relatively low boiler temperatures, but the art has in general considered these water level gauges as the comparison of two water columns, particularly as in fact the figure which it was interested in was the actual linear height of a water column. The gas (steam) pressures on the tops of the liquid columns were considered as equal, as in fact they are, and as not affecting the differential which was an unwarranted conclusion. However, it will be apparent that the weight on the variable head side consists of the weight of the column of water in the boiler and the weight of a column of steam above the same. In the case of low and moderate pressures the weight of the steam is relatively insignificant as compared with the weight of the water. However, the fact is that at temperatures which are now commonplace the weight of the steam becomes a significant factor and, moreover, its variation with increase in temperature is in the opposite sense to the variation of the weight of the boiler water, although less in absolute amount. Thus, at two thousand pounds pressure per square inch absolute corresponding to a temperature of 600 degrees, the density of the water has decreased to .623, but the density of the steam has increased to .085 and as the weight of the steam is reflected as so many inches of water on the manometer it causes a significant variation. The densities of both water and steam equalize at the critical temperature of 705.4° F.

If $d$ is the density of the boiler water the weight of the constant head column CH is definitely related thereto, being equal to the produdct of $d$ and the following multipliers: $20/d$ for Type I, 20 for Type II and $10(1+d)/d$ for Type III and the average density is found by dividing the product by 20. Generically, therefore, we may say that the constant head is a column of liquid of fixed height having an average density definitely related to the density of the boiler water and subject to the boiler pressure on its upper surface. The variable head is a column of the same height and subject to the same pressure, but composed of relatively variable fractional parts of water of density $d$ and of steam of a different density $d2$, dependent like $d$ on the boiler temperature. For general purposes of exposition in this specification however it has seemed desirable to treat the three types separately.

In FIG. 4 the specific gravity of water and of steam are plotted against equal increments of temperature, the corresponding pressures in pounds per square inch being indicated at the top of the graph. It will be seen that as the temperature and pressure rise, the density of the boiler water commences to diminish significantly at even a relatively low temperature and pressure and continues to decrease to the critical point. On the other hand the increase in density in the steam is slight at small pressures, but increases quite rapidly as the temperature passes above 500° F. The weight of a column twenty inches in height, of which $n$ inches are hot water and $20-n$ inches steam, equals $n$ times the specific gravity of the hot water plus $(20-n)$ times the specific gravity of the steam. As the temperature rises the decrease of the first term is always absolutely greater than the increase of the second and the total weight of the column always decreases as the pressure rises, but thet rate of increase is less at the higher temperatures. The variation in either term is non-linear and the total variation nonlinear, as is apparent from the form of the curves.

Figure 5:
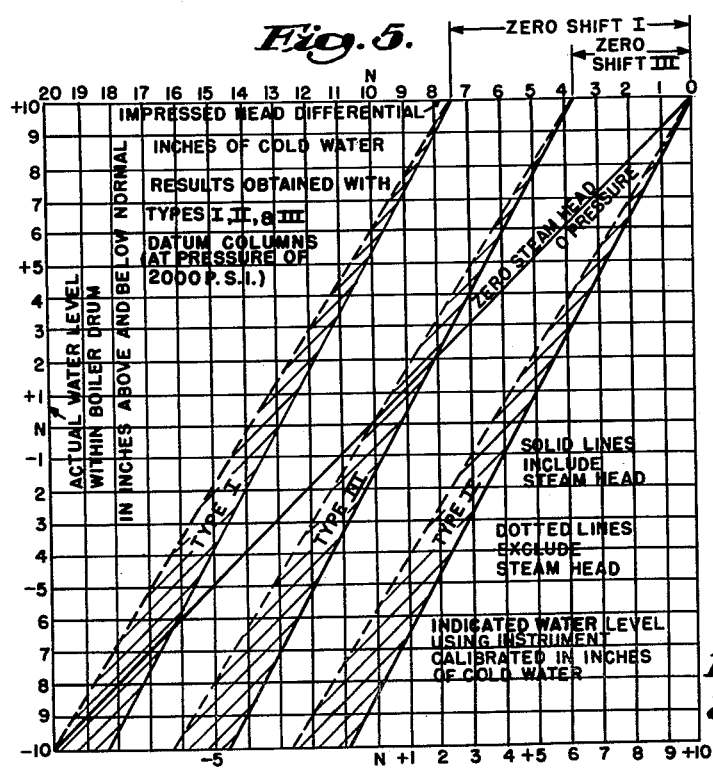

For any given pressure the weight of the column expressed in inches of cold water varies linearly with change of level, as is indicated by FIG. 5 wherein the abscissae represent the head differential and the indicated water level and the ordinates the actual water level in inches above and below normal for the three types of installations which have been considered at 2000 p.s.i. abs. The 45° line across the diagram would represent fluctuations occurring in a tank not under pressure and containing cold water, which would be indicated absolutely correctly on a scale so graduated. The dotted line shows variation due to change in density of the water alone, and it will be noted, reading from left to right, that its intercepts on the 45° line are minus 10, normal and plus 10 respectively for Type I, Type III and Type II. The full lines include the head due to the increased density of the steam, and the substanital errors in indication rising from failure to take this into account will be apparent, being shown by the shaded area between the two lines.

Correction or compensation of the indications given to produce a desired reading on the cold water scale shown at the left would be equivalent in each instance to rotating the solid line about its point of intersection with the 45° line until they coincide.

In the case of Type I and Type III to the left, if we shift the solid line to the right to the zero differential point as shown at the top of the draft, and then rotate as for Type II about that point, we get the same result as with Type II. Hence the correction may be considered as a zero shift and then a rotation.

Figure 6:
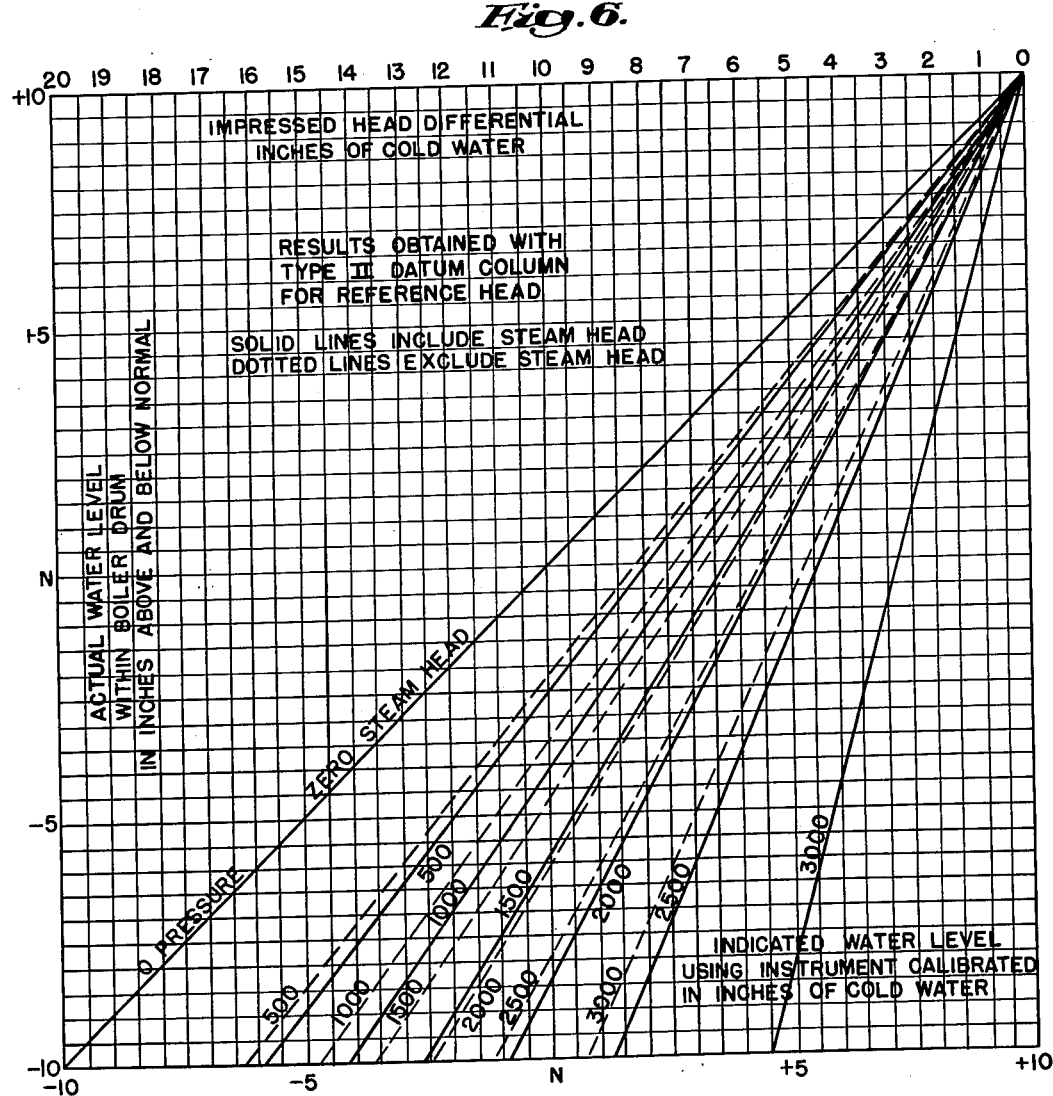
Figure 6:
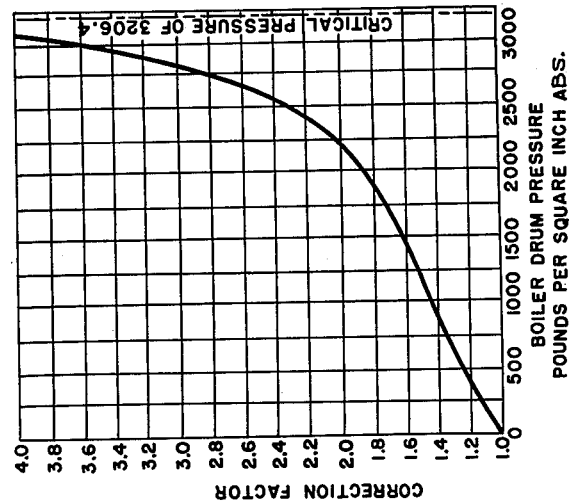

Further to elucidate, FIG. 6 shows for Type II the indicated water levels (abscissa at the bottom of the draft) plotted against actual water levels (ordinates at the left) for various pressures. Here again the dotted lines indicate the variation due to change in water density, while the full lines indicate the variations due to change both in water density and steam density, and the increased significance of the latter as the temperature rises will be apparent.

Similar graphs could be provided for Type I and Type III installations, but on the scale of a patent drawing they would not be clear and those skilled in the art can easily produce the same.

Figure 7:
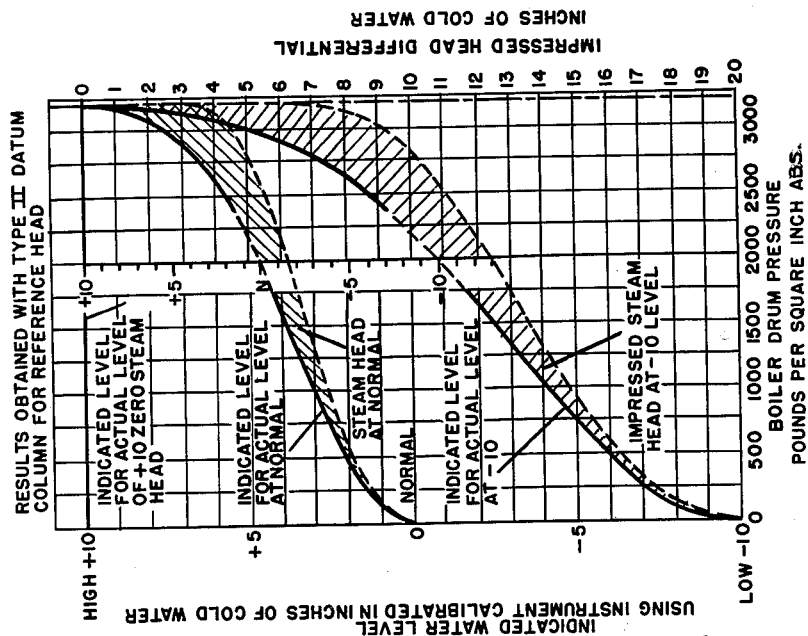

In FIG. 7 there is plotted for Type II a curve with ordinates representing inches of cold water above and below normal, and abcissas representing boiler pressures. Plotted are the indicated levels for actual levels in the boiler at +10, and −10, with the shaded area illustrating the amount of impressed head due to the weight of the steam head. The lower boundary of this area shown by the dash line shows the variation due to the change of specific gravity of the water alone. There is shown superposed on the graph along the 2000 pounds ordinate a scale from −10 to 10 corresponding to the actual levels of the stated amounts existing in the boiler at that temperature. If the boiler were designed to operate at such a certain pressure and did in fact maintain it, a scale so calibrated could be associated with the manifesting mechanism of the manometer. The boiler does not in practice so operate and a different scale would be required to represent the actual movement for each temperature; the scale, as the graph shows, being more compressed as the temperature increases. The operator of a boiler supported to run constantly at 1000 pounds pressure would have an accurate reading for that pressure and for variations relatively close thereto would be better off than with the cold water scale at the left of the figure because the error would be less.

Figure 7A:
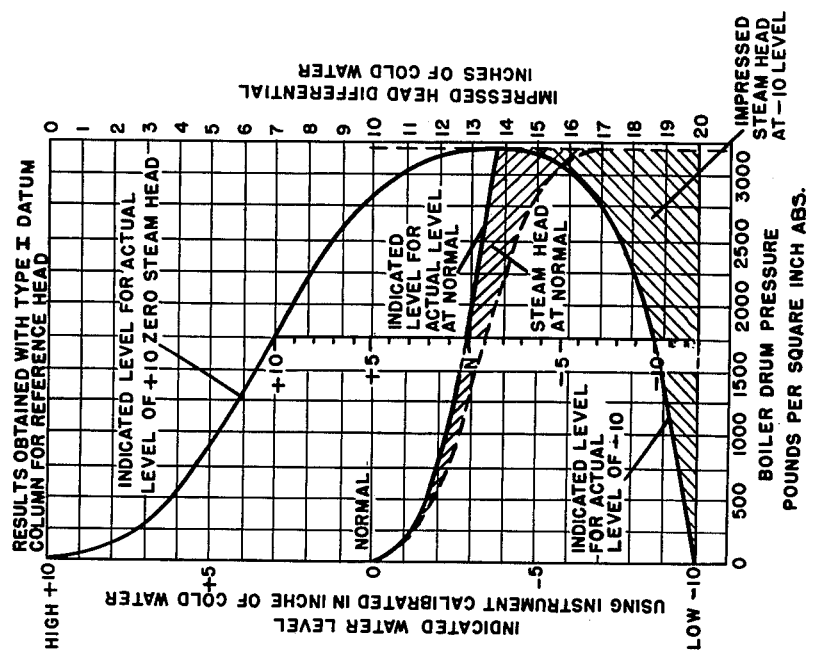
Figure 7B:
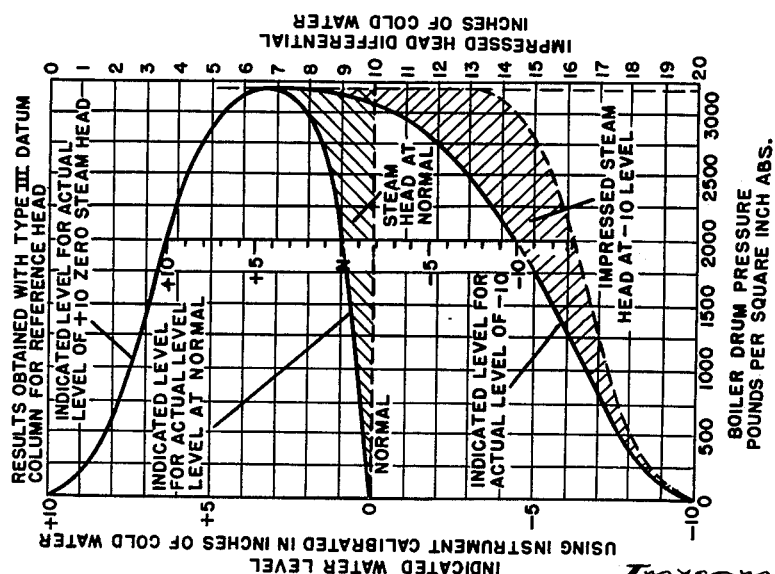

FIGS. 7a and 7b are graphs similar to FIG. 7 for Type I and Type III installations respectively. It will be noted that the superposed scale at 2000 pounds is in each case of the same height as that in FIG. 7, but differently positioned. This illustrates again the "zero shift."

Figures are here given for the three types of installation described, showing the impressed head differentials for high, normal and low levels at 2000 pounds per square inch pressure. The calculations for other pressure values will be apparent.

It may be desirable to point out here that in these tables and in the preceding discussion the ambient temperature has been assumed to be such that the "cold" water at that temperature has a specific gravity of unity or only neglibly differing therefrom, the weight of a column of "cold" water being that of so many inches of water of specific gravity one. Also the distances between high and low are taken as specifically twenty inches. A more generalized statement involving the use of literal quantities would of course be possible, but initial understanding will probably be easier from the more specific statement and a generalization will then present no difficulties.

*TYPE I. (2000 p.s.i. abs.)*

| Indica- tion | Constant head | Variable head | | Differ- ential |
|---|---|---|---|---|
| | | Water | Steam | |
| High | 20×1 | − (20×.6233 | + 0×.0853) | = 7.534 |
| Normal | 20×1 | − (10×.6233 | + 10×.0853) | = 12.914 |
| Low | 20×1 | − ( 0×.6233 | + 20×.0853) | = 18.294 |

*TYPE II. (2000 p.s.i. abs.)*

| Indica- tion | Constant head | Variable head | | Differ- ential |
|---|---|---|---|---|
| | | Water | Steam | |
| High | 20×.6233 | − (20×.6233 | + 0×.0853) | = 0 |
| Normal | 20×.6233 | − (10×.6233 | + 10×.0853) | = 5.380 |
| Low | 20×.6233 | − ( 0×.6233 | + 20×.0853) | = 10.760 |

*TYPE III. (2000 p.s.i. abs.)*

| Indica- tion | Constant head | Variable head | | Differ- ential |
|---|---|---|---|---|
| | | Water | Steam | |
| High | 10×.6233+10×1 | − (20×.6233 | + 0×.0853) | = 3.767 |
| Normal | 10×.6233+10×1 | − (10×.6233 | + 10×.0853) | = 9.147 |
| Low | 10×.6233+10×1 | − ( 0×.6233 | + 20×.0853) | = 14.527 |

In the case of Type I we can express the values for the differential at normal and low as 7.534+5.380 and 7.534+10.760 respectively, and for Type III as $$3.767+5.380$$

and 3.767+10.760 respectively. This emphasizes their relationship to the values for Type II. The second term of each binominal is the same as the value for Type II and the first term illustrates the so-called zero shift which was referred to in discussing FIG. 5. That is, considering Type II the correction to be applied to the differential 5.380, impressed by a water level at normal, to cause it to equal 10 inches is that visualized in FIG. 5 as the swinging of the solid line at the right about the center at zero differential to coincide with the 45° line. The amounts 7.534 for Type I and 3.767 for Type III may be visualized in FIG. 5 as the shift of the upper ends of the corresponding solid lines for those types along the axis of abscissas before a similar rotation.

Considering first the correction in Type II the differential C.H.—V.H. is expressed thus for any given temperature:

Diff=20 $SpG$ hot water—($nSpG$ hot water
$+(20-n)SpG$ steam)

which is a more general statement than that given in the tabulations. As the terms are all simple arithmetical numbers we may multiply by a constant factor K to get a product ($20-n$) which expresses the same level on a cold water scale. Equating and solving we find K to be the reciprocal of ($SpG$ hot water—$SpG$ steam).

The "added amounts 7.534 for Type I and 3.767 for Type III referred to in the second preceding paragraph may be expressed respectively as $20(1-.6233)$ and $20/2(1-.6233)$ where .6233 is the specific gravity of water at the temperature involved (2000 lbs. per sq. inch abs.). The figure 20 is of course the range of the differential. The more general expressions for any temperature $t$ are $20(1-SpG$ water at temp. $t)$ and $20/2(1-SpG$ water at temp. $t)$ for types I and III.

Therefore to convert any given differential into terms of inches of cold water we first subtract in the case of Types I and III the amounts above defined and then multiply by the factor K for that temperature. For Type II as above explained we have no zero correction and merely multiply by K.

The general expressions for these relationships are as follows where—

$W$=actual water level (in terms of inches of hot water)
$H$=impressed differential (in terms of inches of "cold" water)
$L$=total range
$SpGW$=specific gravity of hot water
$SpGS$=specific gravity of steam Type I $$W = L - [H - L(1 - SpGW)]\left[\frac{1}{SpGW - SpGS}\right]$$

Type II $$W = L - H\left(\frac{1}{SpGW - SpGS}\right)$$

Type III $$W = L - \left[H - \frac{1}{2}L(1 - SpGW)\right]\left[\frac{1}{SpGW - SpGS}\right]$$

These formulas may be expressed generically as follows:

$$W = L - [H - kL(1 - SpGW)]\left[\frac{1}{SpGW - SpGS}\right]$$

We have the coefficient $k$ which represents the fractional part of the "high pressure column" which is cold water, being 1 for Type I, 0 for Type II and ½ for Type III. It is conceivable that an arrangement similar to Type III could be provided in which a fraction other than one-half of the column was heated and the value of $k$ would correspondingly change.

FIG. 8 is a graph plotted from the calculated figures wherein the abscissas are increments of pressure and the ordinates are the corrections to be imposed. This graph is for Type II and the correction is zero when the pressure is zero. The ordinate corresponding to 2000 lbs. is marked 1.859, which is the reciprocal of (.6283—.0853).

Inspection of this curve will make clear that if a slide having its edge contoured to the curve (a sliding cam) were reciprocated horizontally proportionately to the pressure variation, it could actuate vertically a suitable follower proportionally to the corrections in order to compensate the manometer indications. The inversion of this mechanism would be a slide having a suitably contoured slot therein to provide a two-way cam, the slot receiving a roller moved horizontally proportionately to pressure.

A sector-like oscillating cam might be laid out by plotting a curve in polar coordinates, the radius vectors representing the connection being angularly spaced to correspond to the increments of pressure. While, as will appear, the advantages of using electrical means in a measuring instrument exemplifying the principles of the invention are such that an embodiment wherein the differential manometer is utilized to provide an electromotive force which is modified by a variable device which might be termed an "electric cam" may be the preferable embodiment, nevertheless the subject matter will probably be more readily understood by first considering how an instrument might be constructed with a mechanical translation of the impressed differential to an indication on a cold water scale.

FIG. 9 is a diagram which will facilitate understanding of the fundamentals which may be taken into account in designing such mechanical instruments. In this figure we suppose that H (the impressed differential expressed in terms of inches of cold water) is given by a point 30 moving vertically in a straight line. In the figure there is shown a reverse scale reading upwardly from zero to 20. It will be understood that this does not represent an actual height of 20 inches and if the movement of the point 30 is that of the meniscus of a mercury manometer, the movement will be in fact in inches of mercury and only about an inch and one-half. At the left a point 32 is guided for vertical movement relative to a scale reading upwardly, expressed in inches of cold water and indicating W the actual level in the boiler. It will be noted that in the figure neither the zero nor the 20 marks are in transverse alignment. That is, we are making no assumption as to their relative positions which may be anywhere. In the figure the point 30 is at a distance above zero on its scale amounting to $C_1H$ inches and the zero of that scale is located $C_3$ inches above the zero point of the left-hand scale, the length of which is $C_2$. The two moving points 30 and 32 engage with forks in the ends of a lever 34, pivoted at 36 and the movement of the point 30, acting through the horizontal lever arm $b$, the horizontal distance between the point 36 and point 30, will be transmitted to the point 32 through the lever arm $a$, the horizontal distance between pivot 36 and point 32. The position of the pivot 36 is determined relative to the origin at the bottom of the left-hand scale by the abscissa $a$ and the ordinate $y$. If the position of 32 is such as to indicate $C_2W$ correctly for the position of 30, it follows from the expression for the multiplying factor K previously given that $a$ is to $b$ as $C_2$ is to $$C_1\left(\frac{1}{SpGW - SpGS}\right)$$

It is possible from the figure to deduce mathematically the value of $y$, but as the derivation is somewhat complicated and difficult to follow, it may be desirable to approach the question in another manner.

Let us assume for this purpose that we are dealing with an instrument of Type II. When the water in the boiler is at the high level (20 on the left-hand scale) and the manometer is at zero on the right-hand scale, the lever 34 will take the position indicated by the line 38 and, while the water remains at this level, although the pressure may change, it will remain in that position. Therefore, whatever the pressure, the point 36 must be along this line and $y$ in the particular case shown is given by the intersection of the center line of lever 34 and line 38. If the particular position shown is the correct one for a given pressure, then if that pressure remains constant, variations in the impressed head causing the lever to move about point 36 will give a correct indication because the multiplying factor K remains the same. In this analysis we have not assumed any particular pressure for the position of the point 36 and it will be seen therefore that all possible positions of 36 will be along the line 38 and the mechanical problem is to provide for lever 34 a movable pivot 36 suitably adjustable along line 38 as the pressure varies. The pivot may move in a slot along the center line of the lever which slot at "high water" coincides with 38.

In FIG. 9 to permit the lever to assume various angular positions between the vertical paths of the points 30 and 32, it is provided with forks providing a sliding and pivotal connection at those points. If the pivot 36 is to move in a slot we can substitute for one or the other of these forks a simple pivotal connection provided that the pin of the pivot, corresponding to the point 30 or 32, moves correctly in a vertical line as, for instance, by being constrained by any suitable straight-line motion of sufficient accuracy for the application.

In FIG. 10 there is shown a schematic arrangement of such a device as applied to Type II. The showing is not realistic and in fact certain parts have been illustrated as they are in order to facilitate showing the construction in a single view. At the right we see point 30 as a pin which, by means not disclosed in detail is reciprocated vertically in proportion to the movements of a float 40 of a differential mercury manometer and guided in a vertical line herein by the Peaucellier's cell 42. The lever 34 at the opposite end has a fork engaging pin 32 on a pointer 44 moving along vertical guides 46 and making an indication on a scale 48. The lever 34 has a longitudinal slot 50 along its center line in which pivot 36 may slide, and this pivot is mounted for movement along the line 38 corresponding to the position of the center line of the arm at the high water reading. Herein I have shown the pin 36 as mounted on a crosshead 52 sliding along fixed guides 54 parallel to line 38, for clearness shown in front of the lever. The crosshead is moved along the guides by a cam 56 pivoted at 58 and adapted to be swung by a connecting rod 60 by a Bourdon tube 62 which is connected to the interior space of the boiler in such a way that its movement corresponds to pressure and therefore also to temperature. This cam is designed in accordance with the principles explained, so that for any given pressure the pivot 36 is moved into a position which will insure that the proper multiplication factor K is applied to the movement of pin 30 in order to give the desired movement of pin 32. The shape of the cam is such that the movement imparted along line 38 has a horizontal component equal to the multiplying factor. The indicator 44 is moved by lever 34 which takes its motion from two drivers, pin 30 and pin 36, the first of which has a motion proportional to the fluctuations of the manometer and the second through cam 56, a non-linear movement which is a function of the variable densities of both water and steam. This construction represents an "aggregate combination" of mechanism effective to display on the index scale the actual number of inches of water in the boiler, irrespective of the variations of density of both water and steam.

The response of a Bourdon tube is linearly proportional to the pressure and in the construction illustrated in FIG. 10 it acts like a crosshead moving a crank. The angular movements of the cam are not therefore proportional to the increments of pressure change. This might be avoided by laying out the ordinates along the radii which in fact would be opposite the follower for the pressure value involved or the cam might be driven by a rack reciprocating by the Bourdon tube and cooperating with a pinion at the center of the cam.

This construction is believed to be the most readily intelligible exemplification of a mechanical construction for carrying out the purpose of the invention for an installation of Type II. For Types I and III an additional correction is called for, the so-called zero correction which is an additive correction and given by the expression $L(1-SpGW)$ as already explained. Viewing FIG. 9 it will be seen that an additive correction could be applied in the construction shown if center 36 and point 32 were moved directly vertically upwardly, permitting the lever 34 to pivot about the pin 30, and that this could be effected by a cam operated by a Bourdon tube. The proportion between $a$ and $b$ for any given position of 36 would not be changed. However, in the arrangement shown in FIG. 10 this would involve moving the crosshead 52 and its supports, the cam 56 and the Bourdon tube 62 which operates it, and require that the latter be connected to the boiler by means permitting such movement. Such an arrangement while not impossible is not to be recommended. If, however, we have a slot like 50 in the lever, it will be seen that it might be given such a shape that it would act as a fixed cam cooperating with pivot pin 36, to give it a vertical movement as the pin moved along the slot. As the horizontal position of the pin 36 is a function of the pressure, the shape of the cam slot would have to be such as to transform this function into the function of pressure which is the so-called zero correction. As a matter of fact a very close approximation of the proper movements may be provided for in the case of Types I and III by mechanisms involving a suitably contoured slot in the transmission arm.

There has already been given in connection with FIG. 9 a formula for the ratio of $a$ to $b$ from which, given $a+b$, we can find the value of either $a$ or $b$. Without here reproducing the analysis the value of $y$ in that figure is found to be as follows:

$$y = C_1 C_2 L \left[ \frac{SpGW - SpGS + k(1 - SpGW)}{C_2 + (SpGW - SpGS)C_1} \right] + \frac{C_2 C_3}{C_2 + (SpGW - SpGS)C_1}$$

If we take reasonable values for the various constants and for the sum $(a+b)$ we can plot the locus of the fulcrum for the range of pressures, conveniently on a large scale. FIG. 11 shows the resulting loci for the three types and it will be seen that for Type II we have the straight line already described, for Type I we have an arc at a higher elevation and for Type III a flatter arc in an intermediate position. Therefore for compensation we must provide for the fulcrum a horizontal increment of movement for the multiplier and a vertical increment of movement for the zero correction.

It would be mechanically convenient if the fulcrum were carried on a swinging arm oscillated by a cam to provide the desired increments of horizontal movement. However since the fulcrum would be at a fixed distance from the pivot of the arm there would be a resultant vertical increment. It should be possible to so contour the slot that the actual vertical movement would be that required.

It is a fact that at least a very close approximation may be provided for Types I and III by mechanisms involving such a pivoted arm with the fulcrum moving in a straight slot along the center line and that the motions may be laid out by graphical methods.

FIG. 12 represents diagrammatically, and without attempt at dimensional verisimilitude, a mechanical device for a Type I instrument so designed. At the right is seen a manometer float 140 which moves pin 130 on which the indicating arm 134 is pivoted by a suitable driving connection such for example as the magnetic coupling of the Winton Patent 2,347,861, which is diagrammed in FIG. 12a. See also FIG. 24 which schematically shows a manometer. The magnetic coupling corresponds in general function to the differential transformer shown in FIG. 24 and is similarly positioned. The float moves a part 141 which corresponds to the "inner armature" described in the patent and the arms 143 turning on the fixed pivot 148 correspond to the "outer armature" of that patent. The movement of pin 130 located on one of the arms 143 is substantially in the vertical plane of the float movement and follows that movement within the limitations noted by Winton. The left-hand end 132 of the arm swings along a suitable scale. The drivers for arm 134 are the pins 130 and 136.

If equal rectilinear increments of movement of a manometer are translated as by such a rotary device into non-equal increments, indications may be made on an arc-shaped scale correspondingly divided and calibrated as described by Winton in Patent 2,347,861. Application of correcting factors in accordance with the equations given will ensure that the indication for a given level of water in the boiler will be the same on such a scale for any boiler temperature. The invention contemplates the modification or "compensation" of a force or movement resulting from a differential pressure to provide, whatever the temperature, a force or movement expressive of actual water level.

The movement of arm 134 is also controlled by pin 136 working in a slot 150 of the arm. The arm thus turns about an instantaneous axis determined by the two pivots 130 and 136 and the pivot 136 is so horizontally positioned as to apply the correcting multiplier as above described to the movements given to arm 134 by the manometer. The pivot 136 is here mounted on a swinging arm 147 moving about a fixed pivot 149 and this arm 147 is swung by cam 156, moved by the Bourdon tube 162. Cam 156 provides for horizontal movement of the pivot 136 to apply the multiplying correction, while the vertical increment of movement of the fulcrum 136, due to its movement about pivot 149, in cooperation with the walls of the slot 150 provides the zero correction.

To graphically lay out the instrument we may establish our two scales, differential and indicated water level, and the distance between them. We draw various positions of the center line of arm 134 between correct positions on the two scales at least at high, low and normal. We make an intelligent choice for the position of 149 guided by the principles explained and if necessary as a result of experiment. Then for the various positions we draw radii the intersections of which with the other lines give the positions of the fulcrum. It will be found that a circular arc may be determined which, moving in a straight slot, will give a close approximation throughout the range. Local modification of the form of the slot may be resorted to provide closer approximation.

FIG. 13 shows a similar arrangement for Type III in which the parts corresponding to those of FIGS. 9 and 10 are designated by numbers increased by 200, that is, 230 corresponds to the part 30 in FIG. 10 and 130 in FIG. 12. As the relative positions of the centers 130 and 149 in FIG. 12 compared with those in FIG. 13 indicate the locus of the point 136 will be a flatter arc in the latter case in harmony with the indications of FIG. 11. The drivers for indicator 234 are the pins 230 and 236.

In the "high water" positions illustrated in FIG. 12 the slot 150 makes a more acute angle with the center line of arm 147 than in FIG. 13 the slot 250 does with the center line of arm 247.

Results of high accuracy for any of the types of instruments may be readily obtained by electrical means and they may well be preferred to mechanical constructions. In the description of FIGS. 9 through 13 it was convenient and most intelligible to speak of movements of a pin 30 for a given distance under the influence of the manometer, and likewise of movements of a pin 32 to give an indication. However, another way of looking at the matter is to consider forces which produce such movements and that is possibly a better way, the movement being a mere manifestation of a force. Therefore if we utilize the movement of the manometer to set up an electromotive force proportional to such movement, we may utilize non-linearly variable electrical devices for varying that force to provide a resultant which will give us the desired indication such as is given by the pointer 44 in FIG. 10. Previously a metaphorical expression "electric cam" has been used, and it may facilitate correlation of the mechanical aspect with the electrical aspect to pursue this analogy with reference to the diagrams, FIGS. 14 through 17.

In FIG. 14 there is shown an alternating current circuit which includes an alternating current source 70, a voltmeter 72 and a coil 74 with movable core 76. Movement of the core in the coil will vary the electromotive force and change the indications of the voltmeter and in particular, if we reciprocated the core 76 by a cam 78 we could effect a non-linear variation. In FIG. 15 instead of a cylindrical core there is shown a tapered core 74a of generally pseudo-spherical form and if this is reciprocated it will cause a variation in the electromotive force which will be non-linearly variable in view of the shape of the core.

In FIG. 16 a circuit includes a source of alternating current 80, the voltmeter 82 and a resistance, or more technically an impedance coil 84 with which cooperates a feeler 86 the movement of which, horizontally in the figure, cuts in and out of the circuit a part of the resistance, thus altering the response of the voltmeter. If this feeler is reciprocated as by means of the cam 88 a non-linear response would be effected, although the movement of the feeler 84 would cause a step by step movement which however might be varied by such small increments as effectively to be a continuous curve following the cam 88. In FIG. 17 the resistor 84a is wound not to cylindrical form but to a tapered or pseudo-spherical form and in this case mere translation of the follower 86 with respect thereto would cause non-linear variation of the circuit voltage. Any of these arrangements might be termed an electric cam mechanism for effecting the electromotive force. This is not a usual term, but is a metaphor which may be helpful to the reader of the present specification.

In the electrical arts the construction of similar "variable" mechanism is highly developed. FIGS. 14 through 17 are not represented as disclosing any novel principle or as illustrating closely any actual construction, but merely for expository purposes to show the fundamental similarity between the forms of instruments now to be described and utilizing electrical indicating and compensating means and the mechanically compensated instruments previously described. In the following description of electrically operated instrument parts are indicated by the usual symbols and those skilled in the electrical art will have no difficulty in procuring or designing the necessary components of the actual instrument of which the figures now to be described are diagrams.

FIGS. 18 through 23 show several possible arrangements for carrying out the invention by electrically operating means. It is convenient to rewrite the equation previously given as follows:

$$L-W=[H-kL(1-SpGW)]\left[\frac{1}{SpGW-SpGS}\right]$$

The principle involved in these arrangements is to provide transducers whereby the measured variables, differential and boiler temperature, control electric mechanisms so combined and coordinated as to produce a resultant in measurable electrical units representative of the second member of the equation.

In each of the examples given the differential as measured by the manometer establishes an electromotive force by a differential transformer 500. While the three lines between the coils of the transformer are part of the conventional symbol for the same it may be helpful to imagine the two outer lines to be a leg of a mercury U-tube and the central line to be the line along which an armature carried by a float moves when the differential varies, thereby to effect the voltage in the secondary coils. Thus in Winton Patent 2,347,861 an armature 30 is moved by a float through a magnetic field and such an armature might be similarly moved as a core of a differential transformer. In each case the primary is excited by an alternating current source the voltage of which is regulated. FIG. 24 shows diagrammatically a mercury manometer of the U-tube type the "constant" and "variable" load head connections marked CH and VH respectively, the manometer having a float 140 carrying an "armature" 141 which latter traverses the differential transformer windings 500 and operates as the movable core of the transformer. In these examples to emphasize the correspondence with the graphs of FIGS. 7, 7a and 7b, the armature is considered as so positioned that with high water in a cold boiler the voltage between points $p$–1 and $p$–2 of the secondary is zero and at low water there is a voltage V. The capacitor 501 bridged across the secondary coils provides for phase regulation. As the armature moves the voltage between points $p$–1 and $p$–2 varies and is proportional to the differential H. In Types I and III a change in position of the armature will cause a (zero shift) voltage V–1 to appear. To compensate for this a potentiometer 502 may be bridged across the primary and controlled responsively to boiler temperature as by means of a Bourdon tube 504 subject to the internal pressure of the boiler to provide a voltage between $p$–1 and $p$–3 equal and opposite to V–1. The lines between the Bourdon tube and the potentiometer in the drawing are to indicate that the latter controls the former but are not intended as a realistic picture of an actual connecting linkage.

It remains to modify the voltage in the circuit by the multiplying factor corresponding to the second bracket in the above equation to produce a voltage measured by voltmeter 506 expressing the value of the second member of the equation. For simplicity in these examples resistance elements are described throughout as the force modifying instrumentality because everyone is familiar with the concept that an increase of resistance in a circuit causes an increase in voltage. However, as will be apparent to skilled electricians, similar modifications may be effected not only by resistances but also by capacitors. inductances or combinations of them. For instance a differential transformer with a core moved by the Bourdon tube could be used to multiply voltage. (Compare FIGS. 14 and 15.)

In FIG. 18 the multiplier is applied by means of a shaped resistance element 508 where the resistances between terminals $f$ and $g$ are related to pressure so as to satisfy the following equation.

$$\frac{R_m}{R_t+R_m+R_{fg}} = \frac{1}{SpGW-SpGS}$$

Where $R_t$ is equal to the internal resistance of the differential transformer, $R_m$ resistance of the meter, and $R_{fg}$ resistance between points $f$ and $g$, the terminals of 508. The response of the voltmeter therefore will be the same for any given level within the boiler whatever the pressure.

In the arrangement described a condition of high water produces a zero voltage. It is possible to reverse the conditions so that zero voltage will appear at low water and thus provide for a fail-safe circuit where a broken connection will indicate low water.

We may here consider the analogies between the electrical mechanism of FIG. 18 and the mechanical device of FIG. 12. The electromotive force set up in the secondary of transformer 500 and proportional to the differential compares with the force which vertically moves pivotal center 130. The former is modified by an additively applied zero correction, an electromotive force from potentiometer 502, reducing except at zero condition the potential. In the latter the camming cooperation of fulcrum 136 and slot 150 applies a force resulting in an additional movement in the vertical direction. Finally the shaping resistor 508 introduces a back electromotive force effective as a multiplier as the cam 156 introduces a force resulting in a movement changing the leverage. These modifying factors vary non-linearly and depend on the temperature of the boiler.

Referring now to FIG. 19 the transformer 500 is controlled by the manometer as before but has two separate secondary coils. At high water level with a cold boiler the voltages across the two coils $V_{ab}$ and $V_{cd}$ respectively are equal, but a change in the water results in a change in the voltages such that $V_{ab}-V_{cd}$ is proportional to the differential pressure H. The rectifiers 2a and 2b convert the alternating current to a direct current applied to the resistive network used with the indicating D.C. voltmeter 506.

The initial conditions of high water level and a cold boiler produce equal voltage in the secondaries of the differential transformer 500.

$$V_{ab}=V_{cd}$$

The circuit values are adjusted for this initial condition such that $$R_{ab}+R_{2a}+R_1=R_{cd}+R_{2b}+R_3+R_2$$

Where $R_{ab}$ is the internal resistance of the secondary $ab$, $R_{2a}$ is the effective resistance of the rectifier 2a, $R_{cd}$ is the internal resistance of the secondary $cd$, $R_{2b}$ is the effective resistance of the rectifier 2b, $R_2$ is the cold boiler resistance of the rheostat 502 controlled by Bourdon tube 504 to apply a zero correction like that of the modification of FIG. 18. The circuit having been adjusted to the above initial conditions where the voltages and the resistances in each coil circuit are equal, then the voltage appearing across points $e$ to $f$ will be zero $V_{ef}=0$, no current will flow in the meter M. This electrical zero indicates the high water level used for the initial condition.

Consider first the Type I datum column. When the boiler is heated and the pressure increases with the water level held constant, a differential pressure H moves the armature of the differential transformer so that $V_{ab}$ is greater than $V_{cd}$. The Bourdon tube 504 measures the increase in pressure and repositions the rheostat 502 so that $$\frac{V_{ab}}{V_{cd}}=\frac{R_{ab}+R_{2a}+R_1}{R_{cd}+R_{2b}+R_3+R_2}$$

Now the resistance and voltage in the two coil circuits are no longer equal but they are so adjusted that the voltage and resistance are accurately proportioned. Again $V_{ef}=0$ and no current flows in the voltmeter 506.

The resistance element of rheostat 502 is so shaped that under the control of Bourdon tube 504 the above ratio is satisfied for any pressure condition at constant high water level. Thus the electrical zero (indicated high water level) is maintained independent of boiler pressure and the "zero correction" factor is applied. In the case of a Type II datum column no zero correction is necessary. The resistance 502 would be fixed and held at the initial conditions.

In the case of Type III datum column zero correction is made in the same manner but the shaping of the resistance element 502 is modified to provide one-half the ratio change so as to satisfy the new conditions for $V_{ab}/V_{cd}$.

It remains to apply the so-called multiplier. This is accomplished electrically by use of a resistor 508 with a shaped element and actuated by Bourdon tube 504. The basis of shaping the element is as follows:

The effective source resistance appearing at points $e$—$f$ is $$\frac{[R_{ab}+R_{2a}+R_1][R_{cd}+R_{2b}+R_3+R_2]}{R_{ab}+R_{2a}+R_1+R_{cd}+R_{2b}+R_3+R_2}$$

The resistor 508 is therefore shaped so as to satisfy the equation $$\frac{R_m}{R_4 + \frac{[R_{ab}+R_{2a}+R_1][R_{cd}+R_{2b}+R_3+R_2]}{R_{ab}+R_{2a}+R_1+R_{cd}+R_{2b}+R_3+R_2}} = \frac{1}{SpGW - SpGS}$$

where $R_m$ is the resistance of the indicating meter 506 and $R_4$ is the required resistance of the Bourdon controlled rheostat 508.

Referring now to FIG. 20 the arrangement of transformer 500 is similar to that of FIG. 18 and potentiometer 502 for zero correction and resistor 508 for the multiplier are similar to the like numbered parts in FIG. 18 and are controlled by Bourdon tube 504. However the potentiometer 502 in this case has a fixed D.C. voltage impressed on its element. Rectifier 510 is used to convert the alternating current of the secondary to direct current. Thus a voltage appears between $c$ and $d$ which is directly related to the voltage between $a$ and $b$. The element of potentiometer 502 is so shaped that for all conditions of boiler pressure at constant high water level the output between points $c$ and $e$ is equal and opposite to that appearing between points $c$ and $d$. Thus the voltage between $c$ and $d$ will be maintained at zero for all pressures at constant high water level. The meter 506 thus maintains electrical zero indicating constant high water level independent of boiler pressure. When a Type II datum column is used zero correction is unnecessary and the potentiometer 502 and constant voltage source are eliminated. When a Type III datum column is used one-half the amount of zero correction that is used in Type I is required.

The "multiplier" is applied by a rheostat 508 which has a shaped resistance element and is controlled by Bourdon tube 504. The resistance between terminals $f$ and $g$ are so related to pressure as to satisfy the following equation:

$$\frac{R_m}{R_{ab}+R_2+R_0+R_{fg}+R_m} = \frac{1}{SpGW - SpGS}$$

where $R_{ab}$ is the internal resistance of the differential transformer 500, $R_2$ is the effective resistance of the rectifier 510, $R_0$ is the resistance of the potentiometer 502, and $R_m$ is the resistance of the indicating meter 506. The resistance of the zero correction potentiometer 502 is partially in the circuit as indicated by the term $R_0$. However error from this condition is minimized by using a low resistance potentiometer and a high current D.C. source to obtain the zero correction voltage. Thus the term $R_0$ can be made very small compared to the total resistance of the other elements of the circuit.

FIG. 21 is in general similar to FIG. 18, but the variable potentiometer 502 for effecting the zero correction, instead of being bridged across the primary coil of the transformer is powered by a separate alternating current source of regulated voltage. The resistance element of potentiometer 502 is so shaped and the constant A.C. source voltage so chosen that for all boiler pressures, at constant high water level the voltage appearing between $c$ and $d$ is equal and opposite to that appearing betwen $a$ and $b$. Thus the voltage between $a$ and $d$ is zero for all pressure conditions at constant high water level. A Type II datum column produces no zero shift with temperature and potentiometer 502 and its constant voltage source may be eliminated. A Type III datum column requires correction similar to Type I but the voltage between $c$ and $d$ is one-half that for Type I. The resistance appearing between $e$ and $f$ of rheostat 508, which introduces the multiplying factor is shaped so as to satisfy the equation $$\frac{R_m}{R_{ab}+R_0+R_m+R_{ef}} = \frac{1}{SpGW - SpGS}$$

where $R_{ab}$ is the internal resistance of the differential transformer 500, $R_0$ is the resistance of the zero correction appearing between $cd$, and $R_m$ is the resistance of the indicating meter 506. The error due to the term $R_0$ is minimized by using a low resistance element with a high current supply for zero correction so that the term $R_0$ is very small compared to the resistance of other elements of the circuit.

FIG. 22 is similar to FIG. 18 except that the temperature within the boiler is measured by sensing resistors commonly referred to by the commercial name "thermistors" and indicated by the letter T. Those in the figure are of the negative type being semi-conductors with a high negative temperature coefficient of resistance. They are made of ceramic material from various metallic oxides. As the temperature varies the resistance varies inversely. By combination of various units a "variable" mechanism in which the resistance is a non-linear function of the temperature is provided. The thermistors are inside the boiler or otherwise subjected to its internal temperature and the electrical circuit is traced directly through them through conductors between them and the other elements of the wiring system of the instrument. There is no mechanically moving part such as the Bourdon tube, but on the contrary, an electromotive force is directly produced which contributes to the production of the final electromotive force measured by a voltmeter 506. "Padding" resistances $R_1$, $R_2$, $R_3$ and $R_4$ are associated with the thermistors in accordance with the practices of the art and thermistor 502a with resistances $R_1$ and $R_2$ form a resistance network for applying the zero correction modification and thermistor 508a with resistances $R_3$ and $R_4$ a resistance network for applying the multiplier.

The resistance network comprising thermistor 502a and its associated resistances thus combines the functions of potentiometer 502 and Bourdon tube 504 of FIG. 18 and the resistance network comprising thermistor 508a and its associated resistances combines the functions of rheostat 508 and Bourdon tube 504 of FIG. 18. The resistance network of 502a is used for Types I and III and provides a voltage such that the algebraic sum of the same and the voltage between $a$ and $b$ is zero for all conditions of boiler temperature. It is not used for Type II. The network of thermistor 508a is so designed that the resistance between points $f$ and $g$ satisfies the following equation $$\frac{R_m}{R_{ab}+R_{ac}+R_{fg}+R_m} = \frac{1}{SpGW - SpGS}$$

where $R_m$ is the resistance of meter 506, $R_{ab}$ is the internal resistance of the differential transformer 500 and $R_{ac}$ the effective resistance of the zero correction network comprising thermistor 502a when present. For Types I and III the error introduced by term $R_{ac}$ can be made small compared with the other circuit elements by proper selection and design.

FIG. 23 is a generally similar arrangement wherein the thermistors 502b and 508b are of the so-called positive type of metallic construction. The network of 502b combines the functions of 502 and 504 in FIG. 18 and the network of 508b the functions of 508 and 504. The method of wiring is apparent from the diagram. Because of the different characteristics of the two types of thermistors 508b is shunted around voltmeter 506 whereas 508a is in series therewith.

The figures for density given in this specification are stated in four significant figures. Four figures are considered proper in computations even of considerable complexity to provide accuracy of about one percent, and in the case of a few simple operations will be more accurate. Since the figures are accurately known, we might as well use them.

Mechanical parts should be constructed with close tolerances characterizing high class instrument making. Electric mechanism may be very accurate. A Bourdon tube is an instrument of high accuracy. Obviously however, assuming a scale to be directly visually observed even of the full dimension of 20 inches, to think of an accuracy of two tenths of an inch is absurd. The parallax would not permit reading the scale so closely and a difference of a few hundredths of an inch in the water level would be negligible. In fact our fundamental datum is the distance between the datum level in the high pressure column and the low level, here taken as twenty inches and determined by connections to the boiler shell. While they are carefully located they are subject to a tolerance. To express the spacing to four figures as 20.00 inches would be incorrect. We should not be sloppy by neglecting good workmanship but we need not overdo it. Thus in describing FIG. 10 reference is made to a Peaucellier linkage as an example of a straight line motion involving pivoted links. This is theoretically exact but approximate straight line motions properly designed would serve. Likewise in that figure the slide for the fulcrum is a theoretically exact motion. In the Winton Patent 2,347,861 there is a discussion of the effects of utilizing a rotary motion to translate a linear motion and under what limitations it is permissible.

Therefore in referring to compensation or correction of the manometer indications an instrument giving mathematically correct results to four significant figures is not contemplated. Such compensation signifies an effective minimization, particularly at the more vital points of the range of the errors which have arisen in the prior art by neglecting the influence of steam head.

The description has referred to indicating on a scale, this implying a reading by direct inspection. Obviously the index hand or pointer could operate mechanism for otherwise manifesting the values involved. It might be a recording pen. If might operate by servomotor mechanism or otherwise some mechanism such as a feed water pump. The invention applies to instruments of the types known as indicators, recorders and controllers and to instruments combining in various ways indicating, recording and controlling functions.

The pointer 44 in FIG. 10, the end 132 of arm 134 in FIG. 12 and the end of the voltmeter needle in FIG. 18 take up positions in spaces such that each position corresponds to a certain water level in the boiler independently of boiler pressure. It is easiest to apprehend this and describe it by reference to an actual physical scale by means of which the positions may be observed and recognized as by direct ocular inspection. Generally such a physical scale would be used but other means for practically availing of the scalar series of positions are not excluded.

While complete practical advantage of the recognition of the hitherto neglected fact that the steam head should be taken into account in measuring accurately the actual water level in the boiler is to be attained only by a compensation as described covering the range of pressures which may occur in the use of the boiler, nevertheless an improvement on practices hitherto known could be attained in the case of a boiler having a nominal constant operating pressure closely maintained much of the time if there is provided a scale like those superposed on FIGS. 7, 7a and 7b for reading the indications of the manometer. The indications on the scale would be correct while that pressure was maintained. Auxiliary scales for a higher and lower pressure could be provided adjacent the main scale primarily to call attention to the fact that substantial variations of pressure render the main scale reading incorrect and to warn of the direction of the errors.

An installation of Type III would be advantageous in this case because, as pointed out in Patent 2,747,404, the error due to change of specific gravity of the water is eliminated when the water level is at normal. The error due to steam head remains and although allowed for on the main scale would be different for different pressures. But with the actual level near normal the errors as the pressure varied from that for which the main scale is calibrated would be relatively small and the indication would remain near normal.

I claim:
1. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, means controlled by the manometer for producing forces proportional to the varied values of the differential pressure, a manifesting device responsive to such forces and having a scalar movement expressive of water level in inches, means responsive to the internal temperature of the boiler and compensating means controlled thereby to modify the said forces, in order to permit the resultant force to activate the manifesting device substantially in accordance with the following equation:

$$W = L - [H - kL(1 - SpGW)]\left[\frac{1}{SpGW - SpGS}\right]$$

where $W$ is the actual water level in the boiler in inches, $L$ is the range of water level fluctuation, $H$ is the impressed differential in inches of cold water, $k$ is a constant expressive of any fraction of the liquid column of fixed height which is composed of cold water, $SpGW$ is the specific gravity of water and $SpGS$ the specific gravity of steam both at the boiler temperature whereby the scalar manifestation for a given water level is the same for any temperature.

2. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, means governed by the manometer for producing forces proportional to the differential, temperature responsive means exposed to the internal temperature of the boiler, means for modifying the output of said responsive means by factors reflecting the densities of water and steam in the columns continuously to compensate for the variations in densities and an indicator operated by the resultant of said modified output and the forces produced by the manometer to be brought thereby to a series of fixed positions each representing a definite water level in the boiler whatever the boiler temperature.

3. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, means governed by the differential response of the manometer to establish a first variable set of forces proportional to the differential, compensating means including a temperature responsive device subject to the internal temperature of the boiler to provide a second variable set of forces which is determined conjointly by the variations in temperature and the specific gravities of both water and steam and an indicator subject to the aggregate action of said forces to be brought thereby to a series of fixed positions each representing a definite water level in the boiler whatever the boiler temperature.

4. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, means governed by the manometer for producing electromotive forces proportional to the differential, variable electrical mechanism responsive to the temperature of the boiler to produce an output varying in correlation with the variations in the variable densities of both water and steam, said mechanism being in circuit with the aforesaid electromotive force producing means to modify the forces to provide a resultant directly proportional to the actual level of the boiler and an indicator moved by said resultant.

5. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, means responsive to the temperature in the boiler, a driver receiving movement proportional to the fluctuations of the manometer, a driver receiving a non-linear movement from the temperature responsive means which is a function of the variable densities of both water and steam and an indicator receiving motion from both said drivers in an aggregate combination effecting scalar movement of the indicator in direct proportion to the actual water level in the boiler.

6. A liquid level measuring device as set forth in claim 5 wherein the second driver receives its movement from the temperature responsive means through cam mechanism.

7. A liquid level measuring device for high pressure boilers comprising a differential manometer, means for imposing on one side of the manometer a constant head of a column of liquid of fixed height of the same density as the boiler water and subject to the boiler pressure, means connecting the other side of the manometer to the water-containing space of the boiler to receive the variable head of a column of the same height, likewise subject to the boiler pressure and composed of relatively variable fractions of water and steam, means governed by the manometer for producing a variable electromotive force proportional to the differential, variable electrical mechanism responsive to the temperature of the boiler to define multipliers involving the densities of both water and steam at the various temperatures compensating for the varied relationship between water level and differential, said mechanism being in circuit with the electromotive force producing means to modify the force to provide a resultant scalar force directly proportional to the actual level in the boiler.

8. A liquid level measuring device for high pressure boilers comprising a differential manometer, means for imposing on one side of the manometer a constant head of a column of liquid of fixed height at least a portion of which is unheated and of a density other than that of the boiler water and subject to the boiler pressure, means connecting the other side of the manometer to the water-containing space of the boiler to receive the variable head of a column of the same height, likewise subject to the boiler pressure and composed of relatively variable fractions of water and steam, means governed by the manometer for producing electromotive forces proportional to the differential, means governed by the temperature in the boiler for producing electromotive forces compensating for the varied relationship between water level and differential arising from the presence of unheated water in the constant head column, variable electric mechanism responsive to the temperature in the boiler to define multipliers involving the densities of both water and steam at various temperatures compensating further for the varied relationship between differential and water level said mechanism being in circuit with both said electromotive force producing means to modify their algebraic sum to provide a resultant scalar force directly proportional to the actual level in the boiler.

9. A liquid level measuring device for high pressure boilers comprising a differential manometer, means for imposing on one side of the manometer a constant head of a column of liquid of fixed height of the same density as the boiler water and subject to the boiler pressure, means connecting the other side of the manometer to the water-containing space of the boiler to receive the variable head of a column of the same height, likewise subject to the boiler pressure and composed of relatively variable fractions of water and steam, means responsive to the temperature of the boiler, a driver receiving movement proportional to the fluctuations of the manometer, a driver receiving from the temperature responsive means through a cam a non-linear movement which is a function of the variable densities of both water and steam and an indicator receiving motion from both said drivers in an aggregate combination effecting scalar movement of the indicator in direct proportion to the actual water level in the boiler.

10. A liquid level measuring device for high pressure boilers comprising a differential manometer, means for imposing on one side of the manometer a constant head of a column of liquid of fixed height at least a portion of which is unheated and of a density other than that of the boiler water and subject to the boiler pressure, means connecting the other side of the manometer to the water-containing space of the boiler to receive the variable head of a column of the same height, likewise subject to the boiler pressure and composed of relatively variable fractions of water and steam, means responsive to the temperature of the boiler, a driver receiving movement proportional to the fluctuations of the manometer, a driver receiving through cam mechanism from said temperature responsive means increments of movement in one direction which are functions of the density in the constant head column and increments of movement in another direction which are functions of the density of water and steam in the variable head column, an indicator receiving motion from both said drivers in an aggregate combination to effect scalar movement of the indicator in direct proportion to the actual water level in the boiler.

11. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, means controlled by the manometer for producing forces proportional to the variations of differential pressure and a scale with reference to which said forces are made manifest nominally expressing in units of linear measure the range of the water level fluctuations and calibrated for the normal operating temperature of the boiler substantially in accordance with the following equations:

$$W = L - [H - kL(1 - SpGW)] \left[ \frac{1}{SpGW - SpGS} \right]$$

where W is the actual level of water in the boiler at said temperature in terms of inches as expressed by the scale, L is the range of water level fluctuations, H is the impressed differential in inches of cold water, $k$ is a constant expressive of any fraction of the liquid column of fixed height which is composed of cold water, SpGW is the specific gravity of water and SpGS the specific gravity of steam, both at the said normal operating temperature.

12. A liquid level measuring device for high pressure boilers comprising a differential manometer, means for imposing on one side of the manometer a constant head of a column of liquid of fixed height having an average density definitely related to the density of the boiler water and subject to the boiler pressure, means connecting the other side of the manometer to the water-containing space of the boiler to receive the variable head of a column of the same height, likewise subject to the boiler pressure and composed of relatively variable fractions of water and steam, a driven manifesting element taking motion from the manometer which movement tends to move the element proportionately to the varied values of such differential pressure, means responsive to the internal temperature of the boiler and compensating means controlled thereby and operatively associated with said element for modifying the motion which would otherwise be transmitted from the manometer to the element substantially in accordance with the following equation:

$$W = L - [H - kL(1 - SpGW)] \left[ \frac{1}{SpGW - SpGS} \right]$$

where W is the actual water level in the boiler in inches, L is the range of water level fluctuation expressed in inches, H is the impressed differential in inches of cold water, $k$ is a constant expressive of any fraction of the liquid column of fixed height which is composed of cold water, SpGW is the specific gravity of water and SpGS the specific gravity of steam, both at the boiler temperature, whereby the scalar manifestation for a given water level is the same for any such temperature.

References Cited in the file of this patent
UNITED STATES PATENTS

| | | |
|---|---|---|
| 2,437,637 | Sprenkle | Apr. 25, 1944 |
| 2,592,744 | Ryant | Apr. 15, 1952 |
| 2,689,932 | Hornfeck | Sept. 21, 1954 |
| 2,791,906 | Vetter | May 14, 1957 |